United States Patent
Chen et al.

(10) Patent No.: US 9,235,382 B2
(45) Date of Patent: Jan. 12, 2016

(54) INPUT FILTERS AND FILTER-DRIVEN INPUT PROCESSING

(71) Applicant: Microsoft Corporation, Redmond, WA (US)

(72) Inventors: Wen-Ke Chen, Redmond, WA (US); Jinsong Yu, Bellevue, WA (US); Alexander P. Riemann, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 14/033,187

(22) Filed: Sep. 20, 2013

(65) Prior Publication Data

US 2015/0089471 A1    Mar. 26, 2015

(51) Int. Cl.
*G06F 9/44* (2006.01)
*G06F 9/45* (2006.01)
*G06F 13/14* (2006.01)
*G06F 17/30* (2006.01)

(52) U.S. Cl.
CPC .. *G06F 8/33* (2013.01); *G06F 8/41* (2013.01); *G06F 9/4445* (2013.01); *G06F 13/14* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 7,149,926 B2 * | 12/2006 | Ahmad | G06F 11/3656 714/10 |
| 7,343,351 B1 * | 3/2008 | Bishop et al. | 705/67 |
| 7,353,542 B2 * | 4/2008 | Shiga et al. | 726/28 |
| 8,380,835 B2 * | 2/2013 | Sagara | 709/223 |
| 8,429,259 B2 * | 4/2013 | Suzuki | 709/223 |
| 8,464,229 B2 * | 6/2013 | Thomson | G06F 8/34 714/15 |
| 8,561,089 B2 * | 10/2013 | Leff et al. | 719/330 |
| 8,683,431 B2 * | 3/2014 | Thomson | G06F 8/34 717/105 |
| 8,867,077 B2 * | 10/2014 | Kobayashi | 358/1.15 |
| 8,959,126 B2 * | 2/2015 | Sagara | 707/827 |
| 2004/0250164 A1 * | 12/2004 | Ahmad | G06F 11/3656 714/30 |

(Continued)

FOREIGN PATENT DOCUMENTS

WO    8606519 A1    11/1986

OTHER PUBLICATIONS

"International Search Report and Written Opinion issued for International Application No. PCT/US2014/056182", Mailed Date: Nov. 19, 2014, 13 Pages.

(Continued)

*Primary Examiner* — Tuan Q. Dam
*Assistant Examiner* — Zheng Wei
(74) *Attorney, Agent, or Firm* — John Jardine; Raghu Chinagudabha; Micky Minhas

(57) ABSTRACT

Input filters correlate to target components. For a given target component, the input filter defines input validation information. The input filter might also define conversions or transformations to be applied to valid input prior to being provided to the target component. At build time, code is accessed that contains the input validation, conversion and transformation and that identifies the associated target component. The information is then used to construct an input filter. At run time, when an input processing component receives an input, the input processing component identifies the target component, accesses the associated input filter, and uses the information contained in the input filter to determine whether the input is valid, and whether and how to convert and transform the value.

19 Claims, 5 Drawing Sheets

(56) References Cited

U.S. PATENT DOCUMENTS

| | | | |
|---|---|---|---|
| 2006/0130038 A1* | 6/2006 | Claussen et al. | 717/168 |
| 2007/0043805 A1 | 2/2007 | Izaki et al. | |
| 2009/0254577 A1 | 10/2009 | Balassanian et al. | |
| 2011/0030066 A1* | 2/2011 | Nakazawa | 726/26 |
| 2011/0145911 A1* | 6/2011 | O'Brien | H04L 63/0227 726/13 |
| 2011/0161918 A1* | 6/2011 | Thomson | G06F 8/34 717/105 |
| 2011/0161941 A1* | 6/2011 | Thomson | G06F 8/38 717/140 |
| 2011/0219446 A1 | 9/2011 | Ichnowski | |
| 2011/0252475 A1* | 10/2011 | Mui et al. | 726/23 |
| 2013/0080505 A1 | 3/2013 | Nielsen et al. | |

OTHER PUBLICATIONS

Chlipala, Adam, "Ur: Statically-Typed Metaprogramming with Type-Level Record Computation", In Proceedings of Conference on Programming Language Design and Implementation, Jun. 5, 2010, 12 pages.

Chlipala, Adam, "Scrap Your Web Application Boilerplate- or Metaprogramming with Row Types", In Technical Report No. UCB/EECS-2006-120, Sep. 29, 2006, 15 pages.

Tost, Andre, "Loosely Typed Versus Strongly Typed Web Services", Published on: Sep. 2, 2005, Available at: http://www.ibm.com/developerworks/webservices/library/ws-loosevstrong/index.html, 11 pages.

"Exchange Web Services Architecture", Published on: Jul. 31, 2012, Available at: http://msdn.microsoft.com/en-us/library/exchange/aa579369(v=exchg.140).aspx, 2 pages.

Gunjan et al., "Web Services and Application Frameworks (.NET and J2EE)", In White Paper of National Oceanic and Atmospheric Administration, Jan. 2008, 14 pages.

"Chapter 21: Designing Web Applications", Published on: Oct. 19, 2009, Available at: http://msdn.microsoft.com/en-us/library/ee658099.aspx, 15 pages.

"Second Written Opinion Issued in PCT Application No. PCT/US2014/056182", Mailed Date: Apr. 7, 2015, 7 Pages.

International Preliminary Report on Patentability Issued in PCT Application No. PCT/US2014/056182, Mailed Date: Sep. 18, 2015, 8 Pages.

* cited by examiner

INPUT FILTERS AND FILTER-DRIVEN INPUT PROCESSING

BACKGROUND

Computers and computing systems have affected nearly every aspect of modern living. Computers are generally involved in work, recreation, healthcare, transportation, entertainment, household management, and so forth. Computing systems are providing ever more complex and sophisticated functionality. Such functionality is often primarily driven by underlying software, which itself is becoming ever more complex. Application developers have the task of developing such software, and to tune performance to ensure efficient and secure operation.

Web applications are often designed and implemented following a client-server computing model. This model usually provides that core application logic is executed on remote servers, execution results are accessed through clients (e.g., web browsers), and client code communicates with server code using an application-layer protocol (e.g., HTTP). Execution of a web application on a server is often driven by a component that takes and parses inputs received from clients, dispatches requests with recognized input parameters to respective business-logic components for processing, and then produces outputs to be sent back to clients.

When processing input, the input processors typically create a data structure for each piece of input provided by the client. The data structure is then provided to the respective business-logic components. However, if an input was received that was an invalid input, the input processors typically create a data structure before determining that the input is, in fact, invalid. Thus, computing resources are used even to process invalid input.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein related to the use of input filters correlated to target components. For instance, the input filters may be used at the input processing stage at the front end, whereas the target components might be response generating components representing back end logic. For a given target component, the input filter defines one or more valid inputs. The input filter may also define routing information, as well as validity checks, value conversions and transformations. The information contained within the input filter may include a wide variety of information.

At build time, authored code is accessed that contains information caused to be inserted by a code authoring entity, such as a programmer or automated programming computing entity. The information is structured to be interpreted by a computing system as identifying the associated target component, and one or more valid inputs to the target component. The information is then used to construct an input filter that preserves the information in a manner to be interpretable by a computing system. Thus, a variety of input filters may be created corresponding to various possible target components.

At run time, when an input processing component receives an input within a request, the input processing component identifies the target component based on routing information, accesses the associated input filter, and then uses the identity of the valid input(s) identified within the input filter to determine whether or not the input is a valid input. If it is a valid input, then the input is provided to the target component. There may be, however, some additional processing before the input is provided to the target component. For instance, the input may be provided after creating a strongly-typed value from the received input, and instead providing that strongly-typed value to the target component. Alternatively or in addition, the value itself may be subjected to some transformation (e.g., conversion from Fahrenheit to Celsius if the value represents a temperature). On the other hand, if the input is not a valid input, then further processing may be avoided. For instance, a strongly-typed value need not even be created for the received invalid input. Thus, if a denial of service attack was to occur, in the form of a request having a large number of invalid inputs, then computing resources are preserved since the invalid inputs may be summarily ignored once identified as invalid.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
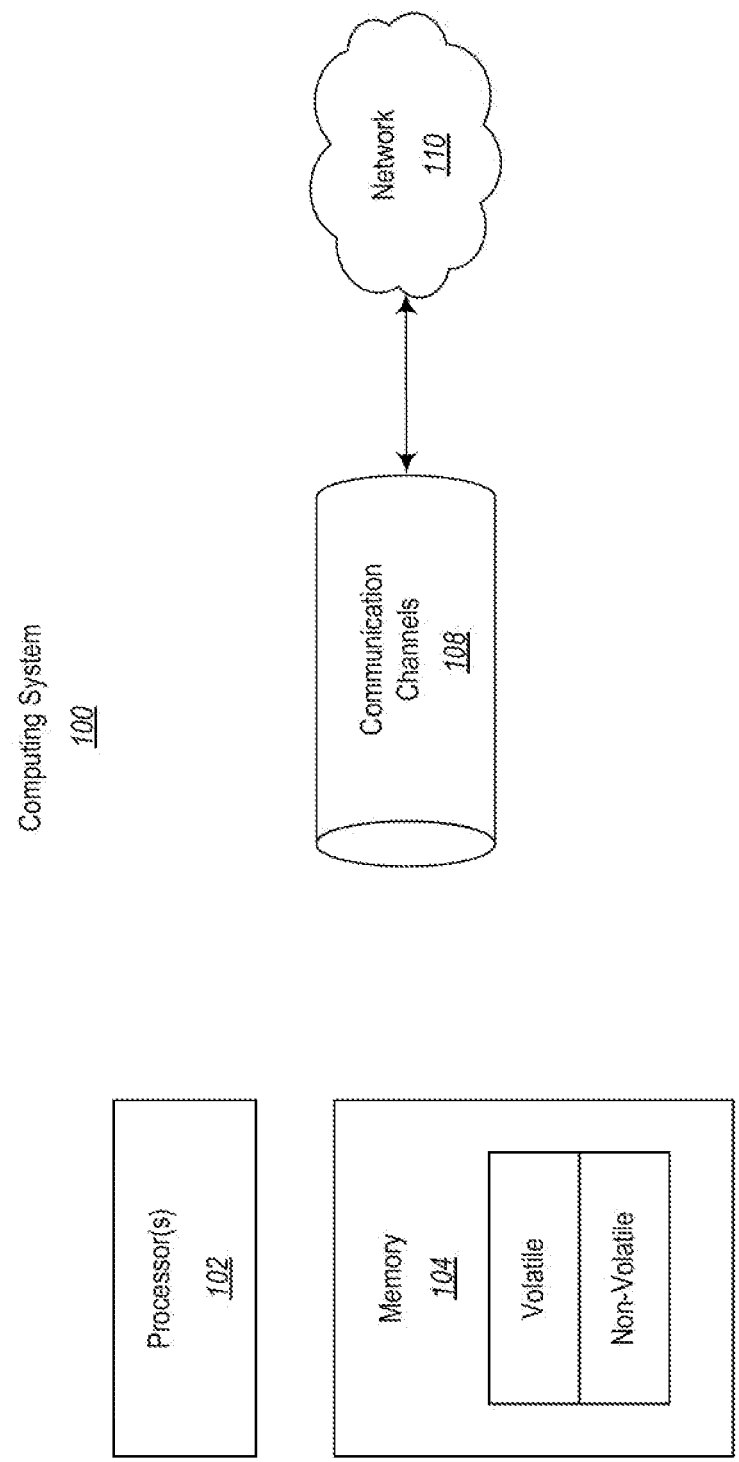
FIG. 1 illustrates an example computing system in which the principles described herein may operate.

At least some embodiments described herein related to the use of input filters correlated to target components. For instance, the input filters may be used at the input processing stage at the front end, whereas the target components might be response generating components representing back end logic. For a given target component, the input filter defines one or more valid inputs. The input filter may also define routing information, as well as validity checks, value conversions and transformations. The information contained within the input filter may include a wide variety of information.

At build time, authored code is accessed that contains information caused to be inserted by a code authoring entity, such as a programmer or automated programming computing entity. The information is structured to be interpreted by a computing system as identifying the associated target component, and one or more valid inputs to the target component. The information is then used to construct an input filter that preserves the information in a manner to be interpretable by a computing system. Thus, a variety of input filters may be created corresponding to various possible target components.

At run time, when an input processing component receives an input within a request, the input processing component identifies the target component based on routing information, accesses the associated input filter, and then uses the identity of the valid input(s) identified within the input filter to determine whether or not the input is a valid input. If it is a valid input, then the input is provided to the target component. For instance, the input may be provided after creating a strongly-typed value from the received input, and providing that strongly-typed value to the target component. There may be, however, some additional processing before the input is provided to the target component. For instance, the input may be provided after creating a strongly-typed value from the received input, and instead providing that strongly-typed value to the target component. Alternatively or in addition, the value itself may be subjected to some transformation (e.g., conversion from Fahrenheit to Celsius if the value represents a temperature). On the other hand, if the input is not a valid input, then further processing may be avoided. For instance, a strongly-typed value need not even be created for the received invalid input. Thus, if a denial of service attack was to occur, in the form of a request having a large number of invalid inputs, then computing resources are preserved since the invalid inputs may be summarily ignored once identified as invalid.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special-purpose or general-purpose computer system that includes computer hardware, such as, for example, one or more processors and system memory, as discussed in greater detail below. The system memory may be included within the overall memory 104. The system memory may also be referred to as "main memory", and includes memory locations that are addressable by the at least one processing unit 102 over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
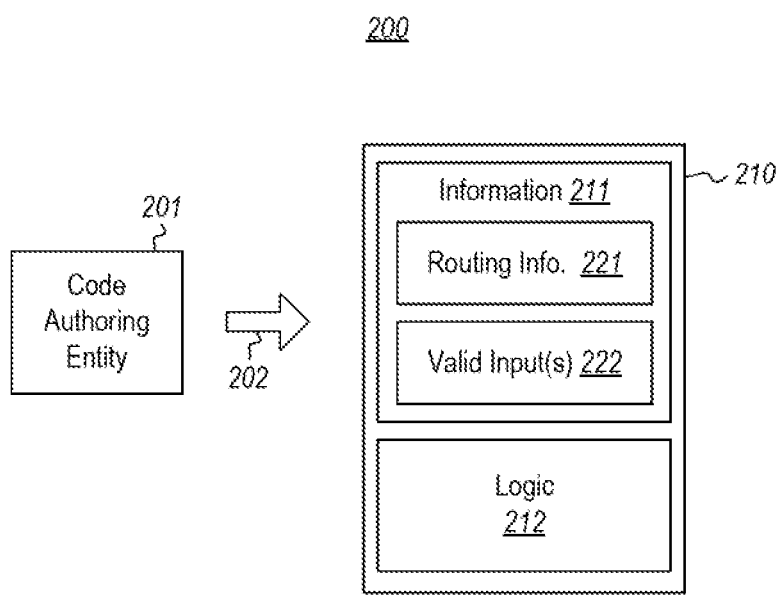
FIG. 2 schematically illustrates a code generation entity that provides information into code at authoring time, such information including valid input(s) and routing information associated with a target component.

FIG. 2 illustrates programming time environment 200 in accordance with the principles described herein. At program time, a code authoring entity 201 generates code 210 (as represented by arrow 202) that includes information 211 such as the routing information 221 (e.g., the identity) of a particular response generation component (also referred to herein as a "target component"). The information 211 also includes a list of 222 of one or more valid input components of the identified target component. The list 222 of valid input(s) may be a fixed set of valid inputs, or may be an extensible set of valid inputs. Although not illustrated, the information 211 may include other information as well, such as perhaps routing information, validity check definitions, type information for conversion of values to strongly-typed values, and transformation definitions defining one or more transformation to be applied to the strongly-typed value prior to providing to the target component. The information contained within the input filter may include a wide variety of information.

The code 210 may include other logic 212. For instance, although not required, the logic 212 might be the logic that instantiates and/or operates the target component identified by component identifier 221.

The code 210 may be, for example, source code that is amendable to authoring by human beings. In that case, the code authoring entity 201 might be a human programmer. However, code generation may also be done in an automated fashion by a computing entity, such as, for example, other executable code, such as program, component, procedure, object, function, method, or the like. In one embodiment, the information 211 may be provided in the form of attributes, headers, keywords, documentation, or the like, so long as the information 211 remains available at build time, when the code is rendered into intermediate format or binary format so as to be machine-executable.

The following represents a source code example of the code 210, with line numbering added for clarity.

```
1.    [Controller(RouteAsDefault = true, ViewPath = "~")]
2.    partial class Greetings
3.    {
4.        [Action(RouteAsDefault = true)]
5.        internal void Welcome(int userAge)
6.        {
7.            string greeting;
8.            // ... Decides what to say
9.            SayWelcome(greeting);
10.       }
11.       [Action]
12.       internal void Goodbye(string timeZone, string[ ] languages)
13.       {
14.           string farewell;
15.           // ... Decides what to say
16.           SayGoodbye(farewell);
17.       }
18.   }
```

In this example, the Action methods contained in controller classes are the entities that handle HTTP requests. The controller classes are annotated with the [Controller] attribute as apparent from line 1 of the example. There are two Action methods within the controller, a Welcome Action extending from lines 4 to 10, and a Goodbye Action extending from lines 11 to 17. The Action methods are annotated with an [Action] attribute.

The [Controller] attribute and the [Action] attributes may both have optional arguments to override default settings used to generate the routing code in the input filter.

The first Action has an identifier "Welcome" which identifies the target component for the Action. The first Action also includes an identification of a single valid input parameter of type "int" and named "userAge". In this case, perhaps the Welcome target component would return a different greeting depending on the user's age.

The second Action has identifier "Goodbye" which identifies the target component for this second Action. The second Action also includes a list of two valid input parameters. The first valid input parameter is of type "string" and is named "timeZone". The second valid input parameter is of type "string[ ]" and is named "languages". In this case, the Goodbye target component would return an appropriate farewell given the current time of day for the user, and given the language of the user.

When not being routed using a default methodology, the name of the controller class and the name of the action method may be used to match predetermined {controller} and {action} segments in a URL string, to thereby determine how to route the input.

Figure 3:
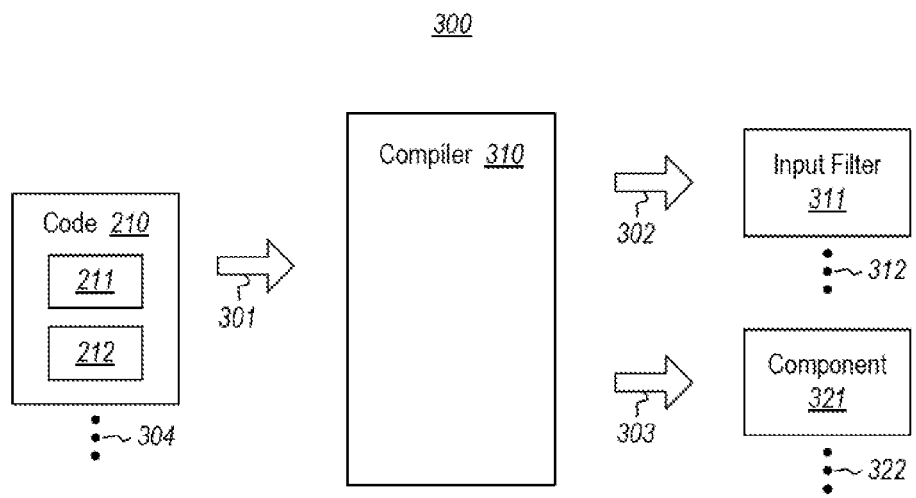
FIG. 3 illustrates a build time environment in which the code is turned into an input filter and a logic component.
Figure 4:
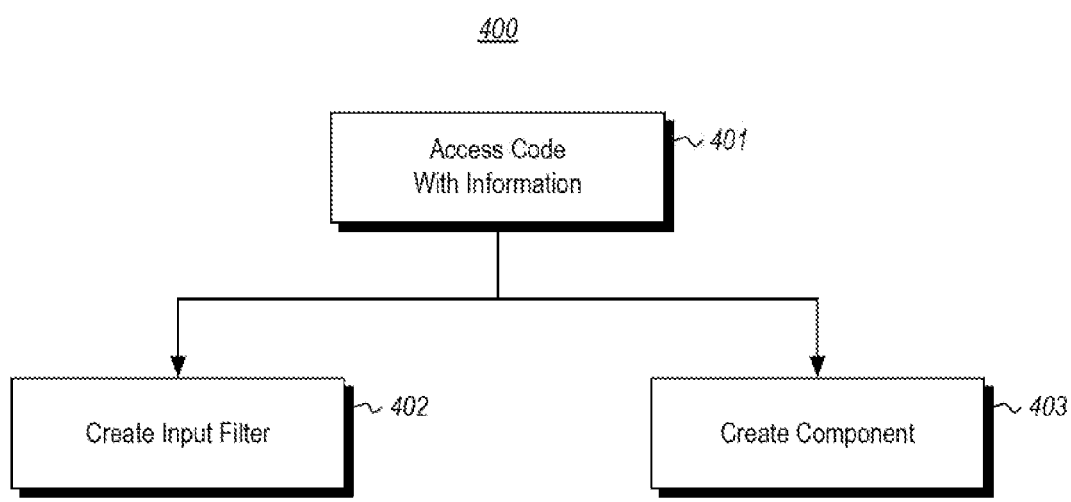
FIG. 4 illustrates a flowchart of a method for constructing an input filter at build time.

FIG. 3 illustrates a build time environment 300. FIG. 4 illustrates a flowchart of a method 400 for constructing an input filter. As the method 400 may be performed in the environment 300, the description of the build time environment and operation will be now be described with frequent reference to both FIG. 3 and FIG. 4.

The method 400 begins by accessing code (act 401) that contains information inserted by a code authoring entity. For instance, in the environment 300, a compiler 310 accesses (as represented by arrow 301) the code 210 that includes the information 211 and logic 212 as described with respect to FIG. 2. Again, the information 211 is structured so as to be interpreted by the compiler 310 as including routing information (such as identifying a target component), and identifying one or more valid inputs for the component.

The compiler then uses the information to construct an input filter (act 402). For instance, the input filter may be structured so as to be interpretable by a potential runtime environment as identifying the routing information, and the one or more valid inputs to the target component. If the valid input(s) specified in the information 211 is a fixed set of valid inputs, the input filter may be configured to support those fixed set of valid input(s). On the other hand, if the valid input(s) specified in the information is extensible (as for example, where the input may be part of an extensible collection), the input filter may enforce an extensible set of valid inputs.

Of course, the information 211 may be structured differently within the input filter 311 than it existed while in the code 210, but nevertheless, the information itself is preserved, albeit in a different form. Referring to FIG. 3, the compiler 310 generates (as represented by arrow 302), the input filter 311. The compiler 310 does this while also generating intermediate or binary code corresponding to the logic (act 403). For instance, in FIG. 3, the compiler 310 is illustrated as generating (as represented by arrow 303) the component 321.

In one embodiment previously mentioned, the component 321 may be the same component that is identified within the input filter 311. Thus, in that case, the author of a component has the opportunity to specify valid inputs and routing associated with the component being authored, and a corresponding input filter with that information preserved will be created at build time.

The ellipses 304, 312 and 322 abstractly represent that the compiler 310 may perform the same method 400 with respect to other components and/or other input filters. Accordingly, whether through this single compiler, or through multiple similarly operating compilers, a library of components, as well as a library of corresponding input filters, may be generated for potential use at runtime.

Figure 5:
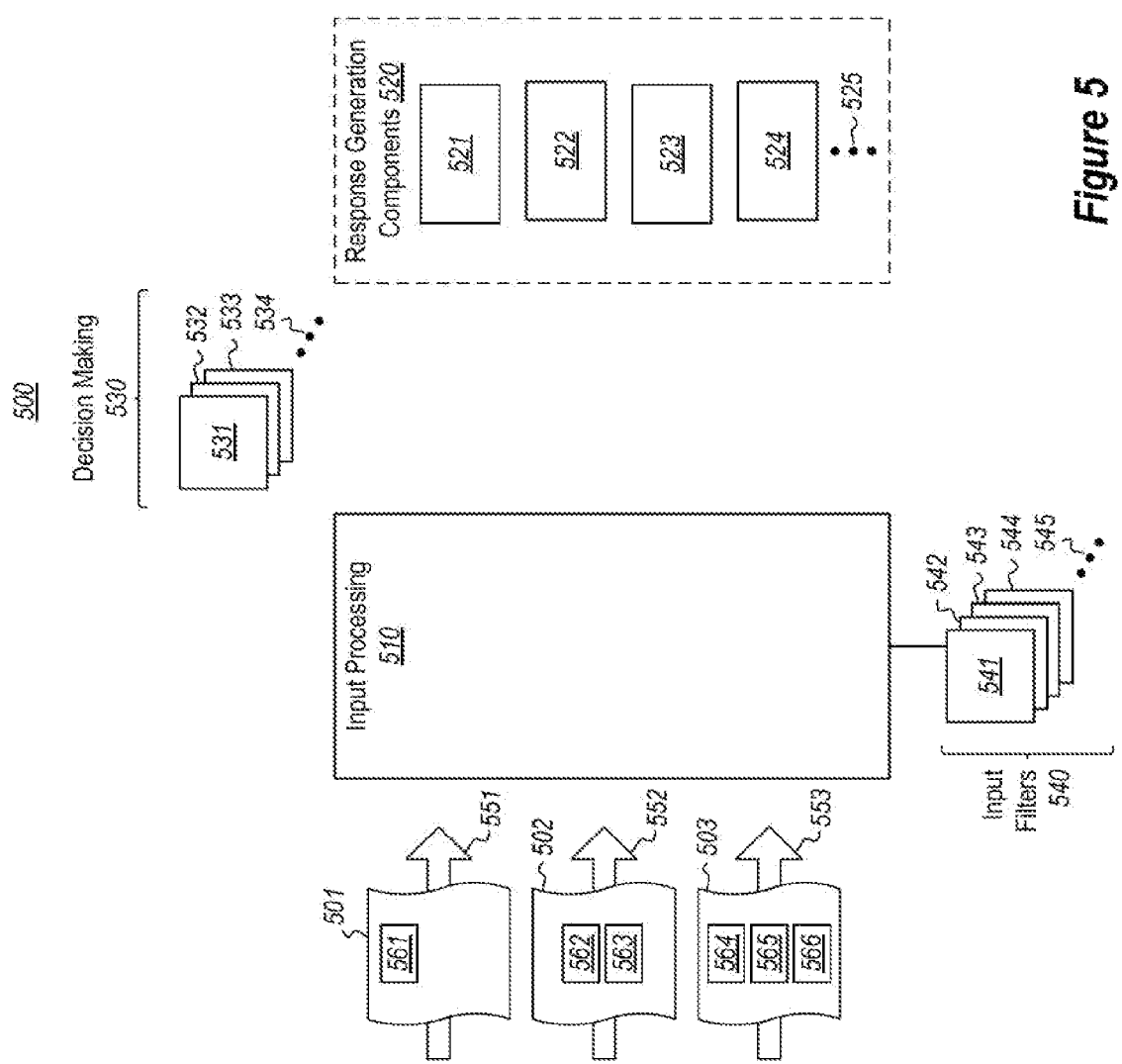
FIG. 5 illustrates an example of a runtime environment that may operate using input filters, and which includes an input processing component.

FIG. 5 illustrates an example of a runtime environment 500 that may operate using input filters, and which includes an input processing component 510.

In the environment 500, the input processing component 510 is illustrated as receiving (as represented by corresponding arrows 551, 552 and 553) three distinct requests 501, 502 and 503. This is for purposes of example only as input processing components may receive any number of requests serially and/or in parallel. In this particular example, the request 501 includes an input 561 that is of a particular type and having a value. The request 502 includes two inputs 562 and 563, each having a corresponding type and value. The request 503 includes three inputs 564 through 566, each having a corresponding type and value.

The environment 500 also includes response generation components 520, which includes the set of possible components that are capable of generating a response for requests 501 through 503. For purposes of example only, the response generation components 520 are illustrated as including four response generation components 521 through 524, although the ellipses 525 symbolizes that the principles described herein are not limited to any particular number of potential response generation components corresponding to inputs received by the input processing component 510. The response generation components 520 may each be, for example, multi-tenant services.

The environment 500 optionally includes routing decision making components 530, which actually make decisions regarding how to route and provide the input to the response generation components 520. In this example, there are three routing decision making components 531 through 533 illustrated, though the ellipses 534 once again represents that there may be any number of decision making components, even potentially zero.

The input processing component 520 has access to an input filter set 540. In this example, each input filter corresponds to a corresponding response generation component 520. For instance, input filter 541 corresponds to target component 521, input filter 542 corresponds to target component 522, input filter 543 corresponds to target component 523, input filter 544 corresponds to target component 524, and so forth as represented by the ellipses 545.

Figure 6:
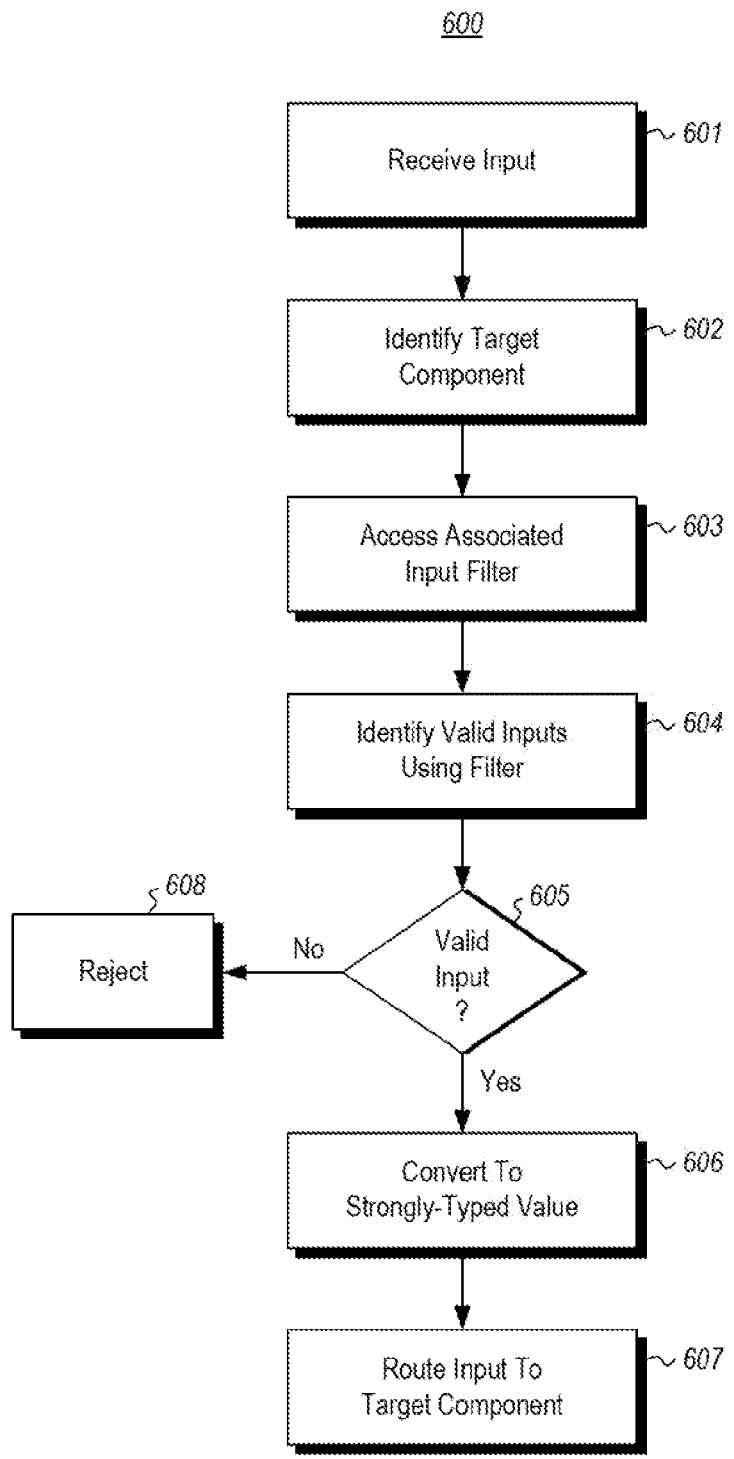
FIG. 6 illustrates a flowchart of a method for an input processing component to route input to target components using the input filters.

FIG. 6 illustrates a flowchart of a method 600 for an input processing component to route input to target components. As the method 600 may be performed by the input processing component 510 in the runtime environment 500, the description of the method 600 will be performed with frequent reference to both FIG. 5 and FIG. 6.

The input processing component receives an input from a request received from an inputting entity (act 601). For instance, the inputting entity might be a client computing system, with the input perhaps provided in response to user input, such as user interaction with a browser. In the example of FIG. 5, the input processing component 510 receives the request 501 having the input 561.

The input processing component then identifies a target component as a target of the request (act 602). For instance, referring to the example of FIG. 5 and request 501, suppose that component 522 is the target of the request 501.

The input processing component then accesses an input filter associated with the target component (act 603). For instance, referring to the example of FIG. 5 and request 501, since the target component is component 522, the input filter 542 is accessed.

The input processing component then interprets the input filter as identifying one or more valid inputs to the target component (act 604). Referring to the example of FIG. 5 and request 501, suppose that there are four valid inputs to the target component 522. Those four valid inputs would be represented within the input filter 542.

The input processing component then uses the input filter to determine whether or not the input received in the request is valid (decision block 605). This may involve multiple steps. Perhaps it is first determined whether or not for each input, the input is of an expected type. If not of an expected type, then the input is invalid ("No" in decision block 605). If the input is of an expected type, it may then be determined whether or not the associated value is formatted correctly given that type. If not formatted correctly, then again the input is determined as invalid ("No" in decision block 605). If the type and format of the input is proper, the validation might still verify that the values fall within an acceptable set or range of values expected for that type. If the value is not acceptable, then again the input is determined as invalid ("No" in decision block 605). Regardless of why the input is determined as invalid, if the input is not valid input ("No" in decision block 605), then the input may be rejected (act 608). If the input is valid input ("Yes" in decision block 605), then the input is further processed. For instance, in FIG. 5, suppose that the input 561 is one of the four valid input types ("Yes" in decision block 605). In that case, the input 561 is further processed.

In the case of further processing ("Yes" in decision block 605), the value is converted into a strongly-typed value expected by the target component (act 606). The further processing might also include other types of transformations to the input, such as compression or encryption, or perhaps the transformation from Fahrenheit to Celsius as in the example above. The input processing component then routes the input to the identified component (act 607). For instance, in the example of FIG. 5 and the request 501, suppose the accessed routing information indicated that the input is first to be provided to the routing decision making component 531. The input processing component 510 would then provide the input 561 to the decision making component 531, and leave it to the decision making component 531 to complete the routing. Alternatively, the routing information might specify that the input processing component 510 is to provide the input to the response generation component 522 without the use of a routing decision making component.

The remaining requests 502 and 503 will be evaluated in the context of FIGS. 5 and 6. The description now moves specifically to the request 502.

The input processing component 510 receives the inputs 562 and 563 from the request 502 (act 601). Suppose the target component for the request 502 is identified as the component 521 (act 602). The input processing component 510 then accesses the corresponding input filter 541 (act 603). Suppose that there are two valid input types (act 604) specified in the input filter 541 for the component 521. The remainder of the method 600 is performed separately for each input 562 and 563.

For input 562, suppose that the input is not amongst the valid input types, does not have a validly formatted value, or does not have a value that falls within an acceptable range ("No" in decision block 605). Accordingly, the input 562 is not routed to the component 521, and perhaps is not processed further (act 608). On the other hand, suppose that input 563 is valid ("Yes" in decision block 605). In that case, the strongly-typed value is created (act 606), and the input 563 (but not the input 562) is provided to the target component 521 in accordance with the routing information (act 607).

The description now moves specifically to the request 503. Suppose that the request 503 represents a denial of service attack. The input processing component 510 receives the inputs 564 through 566 from the request 503 (act 601). Suppose the target component for the request 503 is identified as the component 523 (act 602). The input processing component 510 then accesses the corresponding input filter 543 (act 603). Suppose that there are ten valid input types (act 604) specified in the input filter 543 for the component 523. The remainder of the method 600 is performed separately for each input 564 through 566. However, for each of the inputs 564 through 566, the input is not valid ("No" in decision block 605). Accordingly, the input 562 is not routed to the component 521, and perhaps is not processed further (act 608). Accordingly, significant processing resources are preserved since processing is cut off as soon as the input filter can be used to determine that the input is invalid.

Accordingly, the principles described herein provide an effective mechanism to use input filters, created at built time, to properly identify valid inputs, and reject invalid inputs, and route valid inputs in expected formats to the target component for processing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer-implemented method for generating filters for one or more inputs to an input processor so that the input processor will not unnecessarily use computing resources to generate data structures for invalid inputs, the computer-implemented method being performed by one or more processors executing computer-executable instructions for the computer-implemented method, and the computer-implemented method comprising acts of:

accessing with a compiler code that contains information inserted by a code authoring entity, said information comprising:
logic that instantiates one or more target components, each target component providing services for responding to one or more valid inputs;
routing information to the one or more target components; and
identification information for one or more valid inputs for the one or more target components;

based on the accessed code, the compiler constructing an input filter configured to support the one or more valid inputs by providing at runtime the routing information for one or more target components corresponding to one or more valid inputs identified from the identification information for the one or more valid inputs; and based on the accessed code, the compiler also constructing intermediate or binary code corresponding to the logic for one or more said target components corresponding to the one or more identified valid inputs.

2. The computer-implemented method in accordance with claim 1, wherein the code authoring entity comprises a computing entity.

3. The computer-implemented method in accordance with claim 1, wherein the information inserted in the code is inserted declaratively using one or more attributes.

4. The computer-implemented method in accordance with claim 1, wherein the one or more valid inputs identified in the input filter is a fixed set of one or more valid inputs.

5. The computer-implemented method in accordance with claim 1, wherein the one or more valid inputs identified in the input filter is an extensible set of one or more valid inputs.

6. The computer-implemented method in accordance with claim 1, wherein the identification information for one or more valid inputs specifies a valid input type, a valid input format, and a valid value set for each of the one or more valid inputs.

7. The computer-implemented method in accordance with claim 1, wherein the information caused to be inserted by the code authoring entity further comprises one or both of conversion information for converting an input into strongly-typed values suitable for a corresponding target component, and transformation information describing one or more transformations to be applied to the strongly-typed values.

8. A computer-implemented method for filtering at runtime one or more inputs to an input processor so that the input processor will not unnecessarily use computing resources to generate data structures for invalid inputs, the computer-implemented method being performed by one or more processors executing computer-executable instructions for the computer-implemented method, and the computer-implemented method comprising acts of:

receiving at an input processing component one or more inputs from a request to process the one or more inputs by one or more target components;

the input processing component identifying a target component as a target of the request;

the input processing component accessing an input filter associated with the target component, the input filter being configured
to identify one or more valid inputs for the identified target component, and
to support one or more valid inputs by providing routing information for the identified target component;

based on the input filter, the input processing component filtering the one or more inputs of the request so that the input processor will not unnecessarily use computing resources to generate data structures for invalid inputs by identifying one or more valid inputs for the target component; and the input processing component thereafter providing only those inputs that are valid to the target component.

9. The computer-implemented method in accordance with claim 8, wherein the identified target component is part of a multi-tenant service.

10. The computer-implemented method in accordance with claim 8, further comprising, based on the input filter, the input processing component determining that at least one input is not valid and thereafter the input processing unit not generating a data structure for the at least one invalid input.

11. The computer-implemented method in accordance with claim 10, further comprising, the input processing component refraining from providing the at least one invalid input as an input to the identified target component.

12. The computer-implemented method in accordance with claim 8, wherein providing the valid input to the identified target component comprises, converting at least one of the valid inputs into a strongly-typed value using conversion information provided in the input filter.

13. The computer-implemented method in accordance with claim 8, wherein providing the valid inputs to the identified target component comprises, the input processing component transforming a value of at least one valid input prior to providing the at least one valid input to the identified target component.

14. A computing system comprising:
one or more processors;
one or more computer-readable storage media having thereon computer-executable instructions that are structured such that, when interpreted by the one or more processors of the computing system, cause the computing system to operate an input processing component that is configured to perform a computer-implemented method which comprises acts of:

receiving at an input processing component one or more inputs from a request to process the one or more inputs by one or more target components;

the input processing component identifying a target component as a target of the request;

the input processing component accessing an input filter associated with the target component, the input filter being configured
to identify one or more valid inputs for the identified target component, and
to support one or more valid inputs by providing routing information for the identified target component;

based on the input filter, the input processing component filtering the one or more inputs of the request so that the input processor will not unnecessarily use computing resources to generate data structures for invalid inputs by identifying one or more valid inputs for the target component; and the input processing component thereafter providing only those inputs that are valid to the target component.

15. The computing system in accordance with claim 14, wherein the identified target component is part of a multi-tenant service.

16. The computing system in accordance with claim 14, wherein the identified target component generates a response using at least one of the valid inputs.

17. The computing system in accordance with claim 14, wherein the computer-implemented method further comprises based on the input filter, the input processing component determining that at least one input is not valid and thereafter the input processing unit not generating a data structure for the at least one invalid input.

18. The computing system in accordance with claim 17, wherein the computer-implemented method further comprises the input processing component refraining from providing the at least one invalid as an input to the identified target component.

19. The computing system in accordance with claim 14, wherein providing the valid inputs to the identified target component comprises:
converting at least one of the valid inputs into a strongly-typed value using conversion information provided in the input filter; and
the input processing component transforming a value of at least one valid the input prior to providing the at least one valid input to the identified target component.

* * * * *